United States Patent [19]

Farnham

[11] 4,433,707
[45] Feb. 28, 1984

[54] METHOD AND APPARATUS FOR LEVEL LOADING OF VESSELS USING CATALYST ORIENTED PACKING

[75] Inventor: Robert A. Farnham, San Rafael, Calif.

[73] Assignee: Chevron Research Company, San Francisco, Calif.

[21] Appl. No.: 305,696

[22] Filed: Sep. 25, 1981

[51] Int. Cl.³ .............................................. B65B 1/04
[52] U.S. Cl. ...................................... 141/1; 141/286; 141/392; 239/681; 414/301
[58] Field of Search ............................ 141/1, 285–310, 141/392, 2–12, 71–83; 414/299, 300, 301; 239/681, 682, 684

[56] References Cited

FOREIGN PATENT DOCUMENTS 2703329 3/1978 Fed. Rep. of Germany ...... 414/301
7854 12/1979 France ................................ 141/286

*Primary Examiner*—Houston S. Bell, Jr.
*Attorney, Agent, or Firm*—Burns, Doane, Swecker & Mathis

[57] ABSTRACT

Method and apparatus are disclosed for evenly loading each level of a bed catalyst in a reactor vessel. A cylindrical flow of catalyst particles is divided into one or more annular flow and a smaller cylindrical flow. Each portion of the divided flow is distributed simultaneously to a different radial distance from the center of the vessel so that the catalyst bed is evenly filled at each level. In the apparatus embodiment, a distributor rotor includes a plurality of discs driven by a common drive shaft. Each upper disc is formed with a hub that is radially displaced from the shaft sufficiently to intercept one annular portion of the divided catalyst flow. The upper discs are in each case greater in diameter than the next lower disc so that the peripheral velocity of the disc and the catalyst distributed thereby is greater than the next lower disc. In this way two or more areas are simultaneously filled at each level. This avoids the necessity for changing the speed of a single distributor disc alternately to overfill the vessel at different radial distances from the center and either visually or by calculation determining that the filling is relatively level. Further, it avoids the accompanying problem of radial size classification of catalyst particles.

12 Claims, 7 Drawing Figures

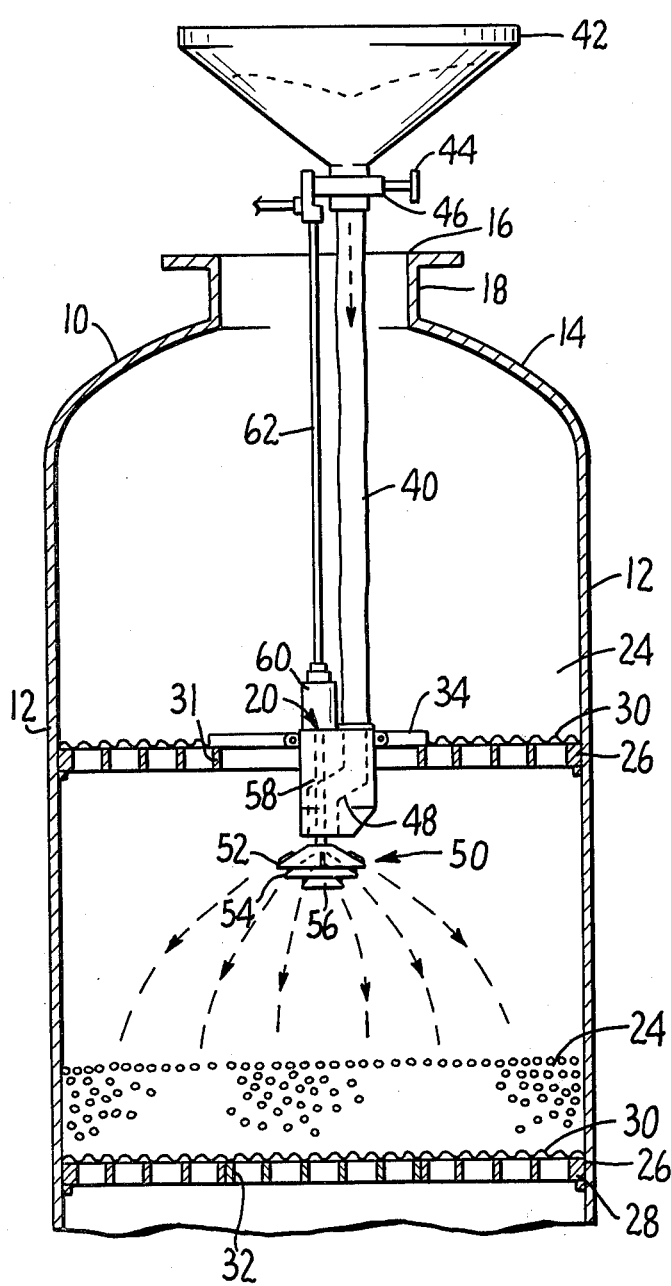
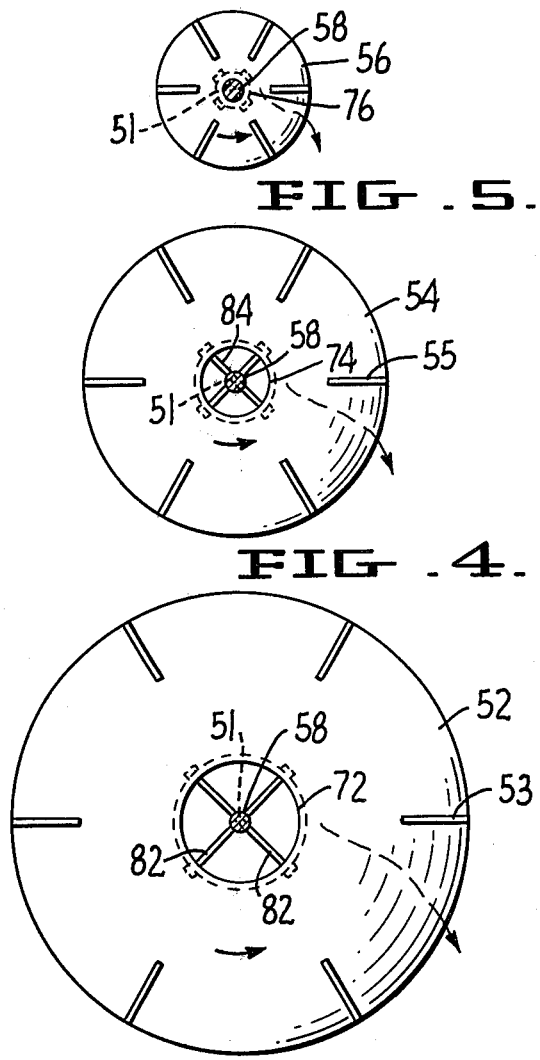
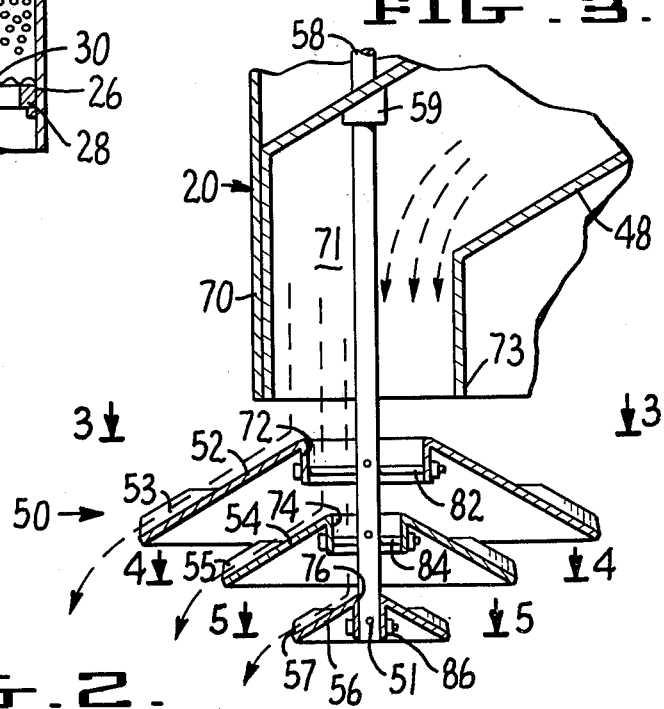

METHOD AND APPARATUS FOR LEVEL LOADING OF VESSELS USING CATALYST ORIENTED PACKING

FIELD OF INVENTION

The present invention relates to methods of and apparatus for loading solid particulate materials, specifically catalyst particles, into a fixed bed, such as a reactor vessel. More particularly, it relates to methods of and apparatus for uniformly loading catalyst particles into large diameter reactor vessels using a rotating distributor having a plurality of rotating disc members to assure that each level of the catalyst bed is uniformly raised from the center of the vessel to its sidewall without classification of different sized particles at different radial distances and without mechanical manipulations of the speed of the distributor.

It is a particular object of the present invention to distribute solid catalyst particles uniformly at a given level in a catalytic reactor vessel by feeding particles downwardly in the vessel in a substantially cylindrical flow to a distributer located a short distance above the level that is then being filled. The cylindrical flow is then divided into concentric annular flows by a rotating distributor comprising a plurality of disc members vertically spaced from each other along a drive shaft and driven by a single rotor shaft. To form the concentric flows, the catalyst particles pass downwardly around the rotor shaft and shower down upon the rotating distributor discs. At least one of the disc members has a hub member radially spaced from the shaft and supported on the shaft by drive pins extending radially between the hub and the shaft. The annular space between the hub and the shaft is selected so that the higher disc has an open annular area through which catalyst particles fall to the lower, underlying disc and strike a substantial part of the annular area of the lower disc. Where more than two discs are used, the discs are of increasing size from the lower disc to the upper disc of the plurality. Since the discs are rotated by a single shaft at the same speed, portions of the catalyst particles falling annularly upon a particular disc leave the disc at a radial velocity determined by its peripheral radius. The effect is that particles are being thrown varying radial distances from the center of the reactor vessel toward the side wall. This permits the entire level of the catalyst bed to be raised evenly and without classification of particles according to sizes due to creation of annular ridges, as by pile up of catalyst at a given radial distance from the center determined by peripheral speed of a single disc. Further, rotation of the catalyst distributor and the rate of supply of catalyst particles may be held constant without need for mechanically varying the speed of a single catalyst distributor and constant monitoring of the catalyst bed then being filled.

BACKGROUND OF THE INVENTION

It is now common practice to fill catalytic reactor vessels having fixed catalyst beds using a catalyst distributor. Such technique has become known as catalyst oriented packing (frequently referred to as COP loading) of vessels. The primary purpose is to minimize void spaces and consequently local "hot spots" which can occur during exothermic reactions of hydrocarbons with the catalyst particles. Additionally, it increases the bulk density of the solid particulate material, catalyst particles, which in turn improves the throughput of reactants for a given size of vessel. Further, it limits settling of the bed when the reactor is brought on stream due to hydraulic forces of fluid flow in the reactor. In general, catalysts can be loaded in 10 to 15% less reactor volume and increased contacting efficiency permits operation of the reactor at lower reactor temperatures.

In general, previously known catalyst oriented loading apparatus included a single distributor disc either having a plurality of radial blades or fin members on top of the rotating element. In general the distributor is a cone shaped member and must be driven at different speeds to achieve a form of radial distribution of catalyst particles falling on the distributor disc. The disc flings or casts the particles toward the side walls of the reactor vessel at distances relate to disc speed. Alternatively, the disc may be a flat plate having vanes formed thereon and having a few holes formed in the plate to permit some of the catalyst particles to fall directly downwardly from the rotating member into the center of the reactor vessel.

U.S. Pat. No. 3,804,273 Uhl is directed to apparatus for loading a catalyst bed with a radial distributor having a conical surface. The only method of distributing catalyst across a large diameter bed is to increase and decrease the speed of the rotating disc.

U.S. Pat. No. 3,972,686 Johnson et al, discloses a flat disc having vanes and a plurality of slots or holes through which some of the catalyst may fall near the center of the bed; the remainder of the catalyst is thrown toward the side. This system also requires variation in the speed of the rotating disc to cover the entire level of a catalyst reactor bed.

A particular disadvantage of both of the prior arrangements lies in the fact that the catayst is thrown into a circular or annular mound which tends to classify catalyst particles falling on it. The larger particles roll to the bottom and outside of the mound while the smaller particles stop on the mound itself. While to a certain extent, these difficulties are alleviated by varying the speed of the rotating disc, the interior of such a bed is usually too full of dust to permit the operator to actually see the catalyst bed from the top while the loader is operating. Accordingly, it is necessary to determine the probable level of distribution by the number of drums of catalyst that have been loaded at a given bed level. Such a procedure is time consuming and not necessarily accurate to the point of permitting level filling of the bed. In fact, it is generally the practice to fill the bed at the outer edge higher than necessary say 6 to 12 inches and then alternately increase the height of the center level above that at the outer edge by a similar amount, and so forth, up the reactor as the depth of the bed or beds is increased throughout the reactor.

SUMMARY OF THE INVENTION

The present invention is particularly directed to apparatus for uniformly filling a reactor vessel at each level with an even distribution of catalyst particles from the center to the outer walls of the reactor vessel (normally circular in shape but sometimes including internal pipes and the like). It is also directed to filling vessels having a plurality of beds generally three or more, each of which is separated by a deck or separator normally covered by a catalyst retaining screen to prevent particles from one bed falling into the lower bed. This maintains a desired thickness of depth for each of the beds. An opening or manway near the center of each deck permits access to the bed below for filling or removing catalyst. In accordance with the method of the present invention, the level of each catalyst bed (whether one or more beds are used in the reactor) is uniformly raised at all radial distances from the center of the vessel and without classification of different size particles. Further, such level filling of each catalyst bed is accomplished without substantial variation in speed of the distributor.

In carrying out the present method, a catalyst distributor is positioned at a suitable level above a bed to be filled. Catalyst is then supplied to the distributor so that a cylindrical column falls on a rotor member having at least a pair of disc members axially spaced along a drive shaft. At least one of the discs has a hub member which is radially spaced from the shaft to form a central annular passageway and the hub is supported thereon by drive pin members that extend radially between the hub and the shaft. At least another disc member of the pair is substantially continuous from the hub member adjacent the shaft so that a substantial position of the disc lies under but axially spaced on said rotor shaft from the first annular disc. In another form of the invention, a plurality of such discs are used in which each of the discs is greater in diameter and each has a hub that provides a central or annular opening therethrough along the shaft that overlies a substantial area of the next lower disc. By forming the discs of different diameters and driving each disc at the same angular velocity (RPM), a different peripheral speed is obtained from each of the plurality of discs. In proceeding from the lowest to the highest disc, the velocity imparted to the catalyst particles, and accordingly the cast distance for particles toward the vessel walls increases. If desired, the discs may be positioned with different axial spacings from each other and the slope or angle of each disc to the motor shaft may be selected to be from horizontal to nearly vertical to give substantially uniform coverage of bed area at a given level in a reactor vessel, independently of the diameter of the vessel.

Further objects and advantages of the present invention will become apparant to those skilled in the art in light of the following detailed description of the preferred embodiments of the invention taken in conjunction with the drawings which form an integral part of this specification.

BRIEF DESCRIPTION OF THE DRAWINGS

FIG. 1 is an elevation view, partially in cross-section, of a reactor vessel having a multiple beds wherein a catalyst distributor arrangement in accordance with the present invention, is deployed in a middle bed.

FIG. 2 is an enlarged, vertical elevation, cross-sectional view of a preferred form of the catalyst distributor head arrangement shown in FIG. 1, indicating flow of catalyst particles therethrough.

FIG. 3 is a plan view taken in the direction of arrows 3—3 in FIG. 2 of the upper-most distributor disc.

FIG. 4 is a plan view taken in the direction of arrows 4—4 in FIG. 2 showing the middle distributor disc; and FIG. 5 is a plan view in the direction of arrows 5—5 in FIG. 2 showing the lower-most distributor disc.

DETAILED DESCRIPTION OF THE INVENTION

Figure 6:
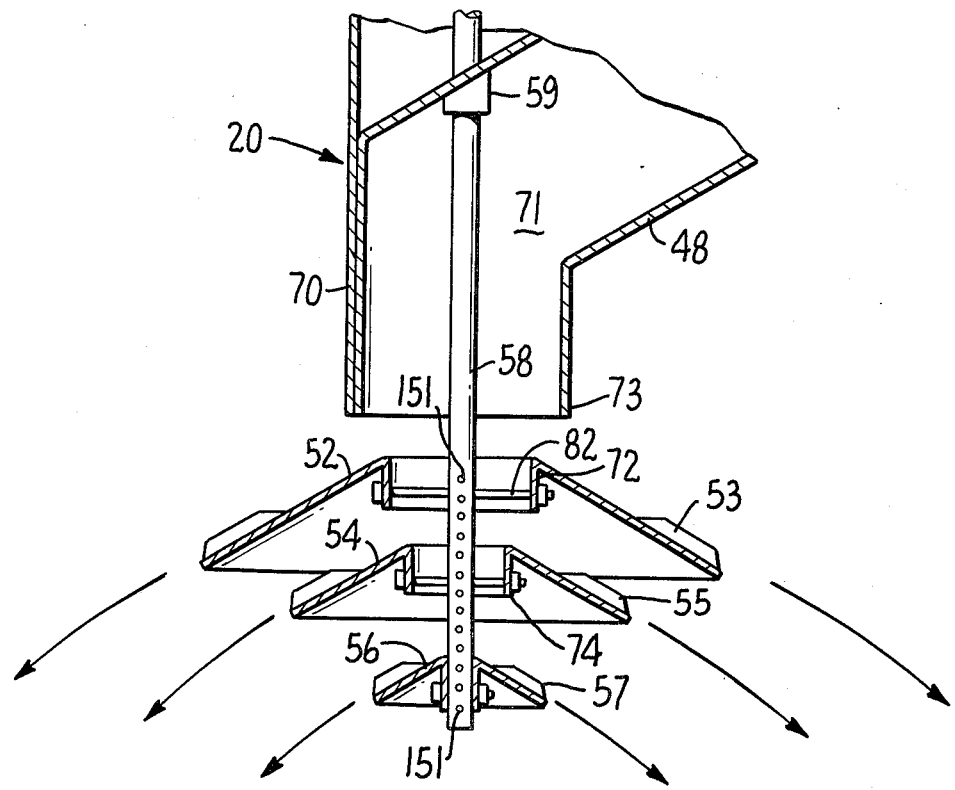
FIG. 6 is a vertical elevation view, similar to FIG. 2, showing means for variable spacing the disc members along the rotor drive shaft.

Referring now to the drawings, and in particular FIG. 1, a catalytic reactor vessel 10 is shown in a cross-sectional elevation view, and illustrates the upper portion of the vessel. Vessel 10, typical of such reactor vessels, is generally cylindrical with a relatively large in diameter, say 15 to 25 feet. It includes circumferential side wall 12 and a hemispherical upper end wall 14. Upper end wall 14 includes a top flange 16 through which reaction fluids may enter or leave vessel 10. In the present arrangement it is shown as comprising a manway 18 sufficiently large in diameter to permit personnel to enter or leave of the vessel. Further in the present arrangement, manway 18 is used for introducing and positioning the catalyst distribution equipment, generally designated as 20, suitable for practice of the method of the present invention. As further indicated, vessel 10 is divided into a plurality of fixed beds 24, such as by separators 26, which as illustrated are open grids 28 covered by screens 30. It will be understood by those skilled in the art that the separator may also be formed by other retainer means however the main purpose of each separator 26 is to support a fixed bed of catalyst and to provide multiple stage processing within the vessel. Typically, these stages may include processing arrangements for catalyst-hydrocarbon contacting, quench mixing, and vapor-liquid-mixture redistribution between successive fixed beds 24, as fluids flow downwardly from inlet ports such as through manway 18 in flange 16. Also in accordance with the method of the present invention, catalyst distribution apparatus 20 is raised to the next higher bed as the vessel is filled from the bottom to the top. For this purpose, separator 26 may include an open passage, also in the form of a manway, designated as 30. In lowermost deck 26 manway 30 is covered by an additional closure member 32, after the low bed is full and the next higher bed is to be filled.

In the embodiment of FIG. 1, catalyst distribution apparatus 20 is positioned, as by pivoted hinge bars 34, generally in the center of manway 30 through upper separator 26. To fill each level of bed 24 evenly, in accordance with the method of the present invention, a cylindrical flow of solid catalyst particles is formed near the center of the reactor vessel by so positioning distributor apparatus 20 and then flowing catalyst particles downwardly as required through a tube, such as a sock member 40, from an upper feed hopper 42. Desirably, although not necessarily, control from feed hopper 42 into flow tube 40 may be controlled by slide gate 44 in valve 46.

While not indicated in the drawing, tube 40 may be shortened as required to permit catalyst to be added to each individual bed 24. Thus, apparatus 20 may be drawn upwardly through the vessel as each bed is filled. To obtain uniform radial distribution of the catalyst particles as the level of each bed is raised, it is important that the catalyst fall fairly evenly over the entire radial distance from the vessel center to side wall 12. Such even distribution avoids the problem of classification of different size particles at circular ridges around the top of the bed as it is being filled. For this purpose, and in accordance with the present invention, catalyst flowing through tube 40 enters housing 70 of distributor 20 through a side entry chute section 48. Catalyst then fills hopper 71 which desirably has volume slightly larger than outlet 73. Outlet 73 from hopper 71 is generally concentric with drive shaft 58 and thereby forms the desired cylindrical column flow of catalyst to the distributor discs. Cylindrical flow from outlet 73 is then divided into an outer annular portion for distribution of catalyst to the vessel at a first velocity sufficient so that such catalyst will generally reach the outer peripheral wall 12. As best seen in in FIG. 2, this is accomplished by forming upper distributor disc 52 with a hub 72 that is radially spaced from drive shaft 58 by drive pins 82 at right angles to shaft 58. Another annular portion is selectively deflected by disc 54 at a second velocity sufficient to reach an intermediate portion of the catalyst bed and a third or central portion of the cylindrical flow is deflected by disc 56 at a still lower velocity to reach the generally central portion of the vessel. The number of different velocities of the individual distributor is of course determined by the total diameter of the vessel. In a larger vessel, more stages of deflection with differing velocities may be desirable. In a smaller vessel, two stages may be adequate.

In the embodiment shown in FIG. 1, the selected velocities for deflecting catalyst particles in the annular portions of the cylindrical flow of catalyst is achieved with rotor 50 which comprises disc members 52, 54 and 56. Rotor 50 is driven by a common shaft 58 through an air motor 60. Power for air motor 60 is supplied by a compressed air line 62 from an external source (not shown). As best seen in FIG. 2, the lower portion of shaft 58 is supported in a bearing 59 at the upper wall of hopper 71 in housing 70.

As particularly distinguished from previously known distributor means for catalyst particles, rotor assembly 50 includes a plurality of cone shaped discs 52, 55, 56. Each conical disc may include blades or fins such as 53, 54 and 57, respectively, on discs 52, 54, and 56. The particular virtue of driving all of the disc members at the same speed is that with increasingly larger diameters from the lower disc 56 to the top disc 52, the peripheral velocity of the individual discs will increase in direct proportion to their radii. Thus, catalyst particles striking the top of disc 52 and being cast by blades 53 will have a higher initial velocity than those particles being thrown by disc 54 and blades 55. Similarly, particles thrown by blades 55 on disc 54 will have a greater radial velocity than those thrown by solid disc 56 and blades 57. To permit successive deflection of the annular portions of the cylindrical fall of catalysts coming out of hopper 71 through cylindrical opening 73, the hubs of the individual discs such as hubs 72, 74 and 76 decrease in diameter going from hub 72 to 74 to 76. In the arrangement as particularly shown in FIG. 3, the largest hub, such as 72 of disc 52, is spaced radially from drive shaft 58 by drive pins 82 passing through holes or keyways 51 in shaft 58. Similarly, as shown in FIG. 4, annular hub 74 of disc 54 is radially displaced from drive shaft 58 and driven by pins 84 also passing through holes or keyways 51 in shaft 58. Desirably, but not necessarily, as in FIG. 5, the lower most disc 56 has a hub 76 which directly engages drive shaft 58.

As indicated in the embodiment shown in FIG. 6, auxiliary holes, such as 151 in drive shaft 58 may be spaced vertically apart at differing distances, and if desired, the individual discs moved by withdrawing pins 82 from hub 72 and repositioned the disc at a different location along the axial length of shaft 58. As also indicated by the drawings, a substantial portion of each of the hubs of a higher disc, such as 72, is radially displaced from shaft 58 sufficiently to permit a significant proportion of the cylindrical flow of catalyst particles to pass through the hub and fall directly onto the upper surface of disc 54. Similarly, hub 74 is displaced from shaft 58 sufficiently so that a significant number of catalyst particles will fall on the top surface of disc 56.

Figure 7:
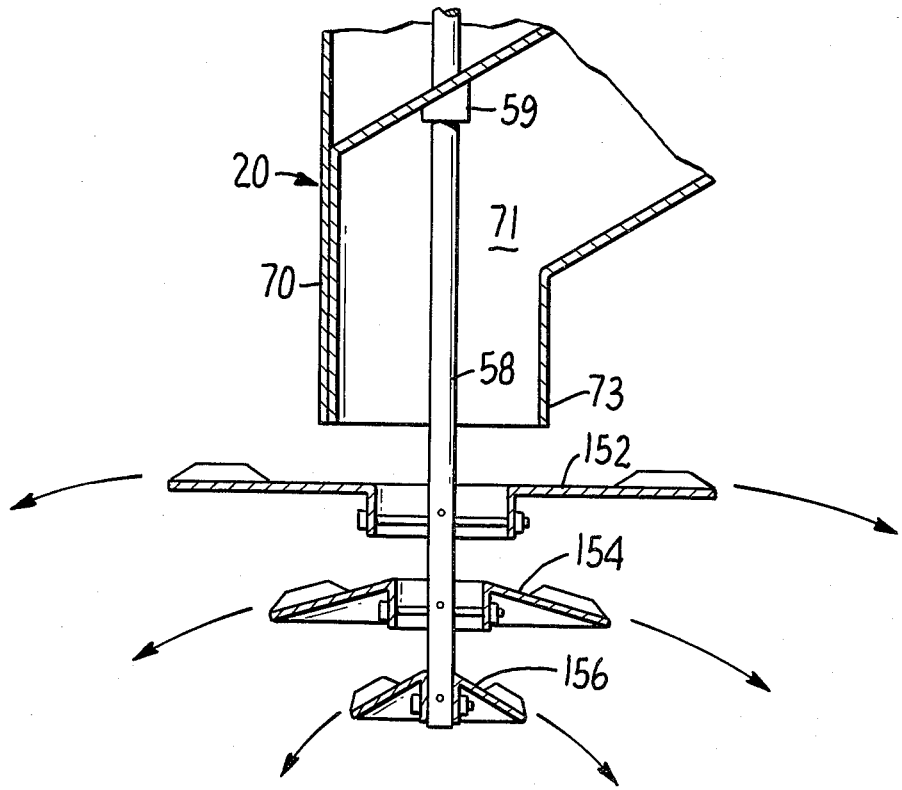
FIG. 7 is a vertical elevation view, similar to FIG. 2, illustrating several modifications of the disc members useful in the arrangements of FIGS. 1 and 6.

With all of the discs being driven at the same speed, the peripheral velocity of the blades 53 will be greater than those of blades 55 and similarly those of 55 will be greater than those of blades 57. As indicated in FIG. 7, the angle to horizontal of the top surfaces of discs 152, 154 and 156 may be varied for further control of the peripheral velocity of the discs. Further, as shown the surface of discs 152, 154 and 156 may be from convex to flat. However, if desired the surface may also be concave.

With the embodiment shown in FIGS. 1 and 2, the catalyst will be thrown at 3 different rates from the center of vessel 10 toward the side wall 12 thereby permitting the horizontal level of the catalyst bed to be raised uniformly and evenly, completely around the radial distances from the center of the vessel to its side wall. Such uniformly level filling of each bed is thus possible without the necessity of the operator manually varying speed of air motor 60 and visual observation of what is being distributed in the vessel 10. Further, the present invention makes it unnecessary for the operator to calculate the amount of catalyst being thrown at each individual speed so that he may infer the potential levelling effect of varying the speed of the rotor. Accordingly, the present apparatus makes possible a fully automatic operation at a single selected speed for air motor 60 and drive shaft 58 for full and uniform filling of the entire surface area at any given level of the bed as each stage of the vessel is filled.

While not shown, it will be appreciated that the distributor apparatus 20 may be moved progressively upward as each catalyst bed is filled. In the upper portion of each stage, or fixed bed 24, it will be desirable to move the catalyst distributor discs as high as possible toward the separator 26 overlying that particular bed.

Various modifications and changes in the apparatus and in the method performed with such apparatus will become apparent to those skilled in the art. All such modifications and changes coming within the scope of the appended claims are intended to be included therein.

I claim:

1. Method of uniformly filling a large diameter catalytic reactor vessel with solid catalyst particles to avoid classification of larger particles and fines at different levels in said vessel which comprises:

providing a gravity flow of said catalyst particles from a first hopper located above said vessel to a second hopper having an outlet located within said vessel and forming a cylindrical flow of said catalyst particles at the outlet of said second hopper near the center of said reactor vessel, dividing the cylindrical flow into an outer annular portion and an inner cylindrical portion, selectively deflecting the outer annular portion of said cylindrical flow radially outwardly at a first velocity sufficient so that said particles will reach the sidewall of said reactor vessel, and then, deflecting the inner cylindrical portion of said cylindrical flow radially outwardly at a lower velocity so that said particles will reach a portion of said vessel intermediate the center thereof and said sidewall.

2. The method of claim 1 wherein said inner cylindrical portion of said cylindrical flow is further divided to form another annular portion and a central portion having a smaller diameter, and said other annular portion is deflected radially outwardly at a velocity intermediate said first velocity and said lower velocity so that said particles will reach two different radial distances in said intermediate portion between said center and said sidewall of said vessel.

3. Method of distributing solid catalyst particles uniformly over the full diameter of catalytic reactor vessel from a rotating catalyst particle distributor running at a substantially constant velocity which comprises providing a gravity flow of a cylindrical body of said catalyst particles from a hopper located above said vessel to a location near the center of said reactor vessel, selectively deflecting radially outwardly an outer annular portion of said cylindrical body to a first disc on said rotating distributor, the periphera of said disc rotating at a speed to impart a first velocity to catalyst particles so that a portion of said particles will reach the sidewall of said reactor vessel, and then deflecting radially outwardly a central portion of said cylindrical body to at least another disc on said rotating distributor, the periphera of said other disc rotating at a speed to impart a lower velocity to enable catalyst particles so deflected to reach a portion of said vessel intermediate the center thereof and said sidewall.

4. The method of claim 3 wherein said central portion of said cylindrical body is further divided into another annular portion and a smaller central portion by deflecting radially outwardly said other annular portion to a third disc on said rotating distributor, the periphera of said third disc rotating at a speed to impart a velocity to said catalyst intermediate said first velocity and said lower velocity to enable catalyst particles to reach two different portions of said vessel between said center and said sidewall.

5. Method of radially distributing solid catalyst particles uniformly to raise the level of the catalyst bed at all radial distances from the center of said vessel to its side wall without classification of different sized particles and without substantial variation of speed of the distributor for said particles which comprises providing a gravity flow of a cylindrical body of said catalyst particles from a hopper located above said vessel to a location near the center of said reactor vessel, selectively deflecting an outer annular portion of said cylindrical body radially outwardly to a first disc on said distributor, the periphera of said first disc rotating at a speed to impart a first velocity to approach the sidewall of said reactor vessel, and then deflecting radially outwardly another portion of said cylindrical body to at least another disc on said distributor, the periphera of said other disc rotating at a speed to impart a lower velocity to said other portion of said cylindrical body to enable catalyst particles so deflected to reach a portion of said vessel intermediate the center thereof and said sidewall.

6. Apparatus for loading solid catalyst particles uniformly over a given level in a catalytic reactor vessel without requiring speed variations of the distributor rotor means which comprises means for positioning a catalyst particle distributor in the central portion of a reactor vessel, said distributor including a catalyst feed hopper having inlet means adapted to be supplied by a catalyst particle supply hopper above said vessel and a catalyst supply tube for guiding a gravity flow of catalyst particles from said supply hopper to said feed hopper inlet means, said feed hopper having an outlet opening for flowing catalyst particles therefrom to a distributor rotor, means for driving said distributor rotor including motor means mounted on said distributor and a rotor shaft extending substantially concentrically through said outlet opening, and having rotor means secured thereto and said rotor means having at least a pair of disc members axially spaced on said drive shaft, one of said discs having a hub member radially spaced from said shaft and supported thereon by pin members extending between said hub and said shaft, and the hub of said other disc directly engaging said rotor shaft.

7. Apparatus in accordance with claim 6 with the addition of at least one additional disc member axially spaced intermediate said pair of axially spaced disc members, said additional disc having a hub radially spaced from said shaft, such radial spacing of said hub being intermediate the radial spacing of the hub of said one disc and said other disc of said pair.

8. Apparatus in accordance with claim 6 in which the axial positions of said disc on said rotor shaft may be selectively changed.

9. Apparatus in accordance with claim 8 in which said rotor shaft includes a plurality of axially spaced apart drive connector means and said hubs of said pair of discs are each driven by pin means extending through its hubs and one of said connector means.

10. Catalyst distributor means for oriented packing of catalyst particles in a catalytic reactor bed, comprising rotor means rotatable by a drive shaft extending through a catalyst supply hopper to which catalyst particles are supplied for filling a catalyst bed, said drive shaft being substantially concentric with the outlet means of said supply hopper and rotor means comprising a plurality of annular discs, each of said plurality being greater in diameter and having a hub opening to overlie a substantial area of the next lower disc, each of said discs being axially spaced from the other discs along said drive shaft, means connecting each of said discs to said drive shaft for common rotation therewith and at least all but the bottom disc permitting flow of catalyst particles between the hub thereof and said drive shaft, at least some of said discs being frusto-conical in shape with the apex thereof extending upwardly along said shaft and with the angle to horizontal of each of said frusto-conical discs being different from that of every other frusto-conical disc.

11. The apparatus of claim 10 wherein the angles to horizontal of said frusto-conical discs increase in succession in the downward direction along said shaft.

12. The apparatus of claim 11 wherein the uppermost disc is planar.

* * * * *